US012346511B2

(12) United States Patent
Sanyal et al.

(10) Patent No.: US 12,346,511 B2
(45) Date of Patent: Jul. 1, 2025

(54) DIGITAL ASSISTANT HUMAN-MACHINE INTERACTION DEVICE

(71) Applicant: Continental Automotive Technologies GmbH, Hannover (DE)

(72) Inventors: Saptak Sanyal, Singapore (SG); Ling Chih (Daniel) Teng, Singapore (SG); Thomas Gress, Steinbach (DE); Maharaja Sankaralingam, Singapore (SG); Pixie Ru Jun Tham, Singapore (SG); Chee Wei Lee, Singapore (SG); Boon Ching Ng, Singapore (SG); Jason Choon Leng Tan, Singapore (SG)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/564,254

(22) PCT Filed: Mar. 14, 2022

(86) PCT No.: PCT/EP2022/056451
§ 371 (c)(1),
(2) Date: Nov. 27, 2023

(87) PCT Pub. No.: WO2022/248094
PCT Pub. Date: Dec. 1, 2022

(65) Prior Publication Data
US 2024/0248555 A1 Jul. 25, 2024

(30) Foreign Application Priority Data
May 28, 2021 (GB) ..................................... 2107618

(51) Int. Cl.
*G06F 3/041* (2006.01)
*G06F 3/14* (2006.01)

(52) U.S. Cl.
CPC ............... *G06F 3/041* (2013.01); *G06F 3/14* (2013.01)

(58) Field of Classification Search
CPC . G06F 3/011; G06F 3/041; G06F 3/14; G06F 3/01; G06F 1/3231; G09G 2354/00
See application file for complete search history.

(56) References Cited

U.S. PATENT DOCUMENTS

| 8,167,253 B2 * | 5/2012 | Smith ................... A47B 81/06 108/93 |
| 10,360,876 B1 * | 7/2019 | Rahman .................. G09G 5/14 |

(Continued)

FOREIGN PATENT DOCUMENTS

| CN | 109544743 A | 3/2019 |
| DE | 102008045123 A1 | 3/2010 |

(Continued)

OTHER PUBLICATIONS

Search Report dated Oct. 13, 2021 from corresponding GB patent application No. 2107618.7.

(Continued)

*Primary Examiner* — Koosha Sharifi-Tafreshi
(74) *Attorney, Agent, or Firm* — COZEN O'CONNOR

(57) ABSTRACT

A digital assistant device comprises an input component configured to acquire information from a plurality of users in a predetermined area around the digital assistant device and to output signals indicative of the acquired information, a processing component configured to receive the signals output by the input component and to generate individual user output information for several or each of the users, and an output component configured to output the generated output information uniquely assigned to a particular user in a user-characteristic way.

11 Claims, 3 Drawing Sheets

(56) References Cited

U.S. PATENT DOCUMENTS

| | | |
|---|---|---|
| 2010/0222957 A1 | 9/2010 | Ohta et al. |
| 2014/0225811 A1* | 8/2014 | Killguss ............... B60K 35/23 345/7 |
| 2016/0329003 A1 | 11/2016 | Wang et al. |
| 2017/0289766 A1 | 10/2017 | Scott et al. |
| 2022/0004252 A1* | 1/2022 | Lee ............... H04N 21/42203 |
| 2023/0237944 A1* | 7/2023 | Mitani ............... H05B 47/16 345/156 |

FOREIGN PATENT DOCUMENTS

| | | |
|---|---|---|
| EP | 3185122 A1 | 6/2017 |
| EP | 3193251 A1 | 7/2017 |
| JP | 2006146164 A | 6/2006 |
| JP | 2006184573 A | 7/2006 |
| JP | 2007024866 A | 2/2007 |
| JP | 2007121796 A | 5/2007 |
| JP | 2009120181 A | 6/2009 |
| JP | 2009160966 A | 7/2009 |
| JP | 2012227844 A | 11/2012 |
| JP | 2014190995 A | 10/2014 |
| JP | 2017111200 A | 6/2017 |
| JP | 2018169758 A | 11/2018 |
| JP | 2020075572 A | 5/2020 |
| JP | 2020134817 A | 8/2020 |
| KR | 20190097511 A | 8/2019 |

OTHER PUBLICATIONS

International Search Report and Written Opinion dated Aug. 18, 2022 from corresponding International patent application No. PCT/EP2022/056451.

Letter of Reasons for Refusal mailed on Oct. 2, 2024 from corresponding Japanese patent application No. 2023-567033.

Seond and Final Notice of Reasons for Refusal for Rejection mailed on Mar. 19, 2025 from corresponding Japanese patent application No. 2023-567033.

* cited by examiner

DIGITAL ASSISTANT HUMAN-MACHINE INTERACTION DEVICE

CROSS REFERENCE TO RELATED APPLICATIONS

This U.S. patent application claims the benefit of PCT patent application No. PCT/EP2022/056451, filed Mar. 14, 2022, which claims the benefit of GB patent application No. 2107618.7, filed May 28, 2021, both of which are hereby incorporated by reference.

TECHNICAL FIELD

The present disclosure relates to a digital assistant device, for example to an in-car digital assistant device.

BACKGROUND

Over the past years a large variety of digital assistants have been proposed as digital assistants aiming at a human-like interaction with their users. Available digital assistants, however, do not interact individually with a plurality of users in a multi-user environment.

SUMMARY

An object of the present disclosure is, hence, the provision of a digital assistant device configured for an individual interaction with a plurality of users in a multi-user environment.

According to the present disclosure, this object is attained by a digital assistant device including: an input component configured to acquire information from a plurality of users in a predetermined area around the digital assistant device and to output signals indicative of the acquired information, a processing component configured to receive the signals output by the input component and to generate individual user output information for several or each of the users, and an output component configured to output the generated output information uniquely assigned to a particular user in a user-characteristic way. The digital assistant device may be configured as an in-car digital assistant device optionally mounted in a dashboard of a car. In an in-car environment, the plurality of users may include or may consist of a driver and a co-driver.

In the predetermined area around the digital assistant device, a distance between a user, several of the users or all users, on the one hand, and the digital assistant device or at least some of its components, on the other hand, may range between few centimeters to few meters. In case of an in-car assistant device, the predetermined area may correspond to an interior of a car equipped with a digital assistant device according to the present disclosure.

A digital assistant device according to the present disclosure is configured to handle the inputs from a plurality of users individually, to process the information received from the plurality of users individually, and to output information in a user-characteristic way. Consequently, a digital assistant device according to the present disclosure is configured for an individual interaction with a plurality of users in a multi-user environment.

In an embodiment, the processing component may be configured to determine the position of a user or the positions of several users or the position of each user relative to the digital assistant device from the signals output by the input component. This may be done through either audio sensing, utilizing auditory localization and/or using visual sensing (e.g. camera devices). The relative positions of the user/users may be used to optimize the output of the output component with respect to the individual users and to thereby enhance the user experience.

The processing component may include one or more processors operatively coupled to one or more memories such as a read-only memory (ROM) and/or a random-access memory (RAM). The processing component may be part of an embedded system and/or a cloud based processing component.

The output component may include a display. The display may be configured as or may include an LCD, LED, µLED or OLED display and/or may be configured as a high-resolution display. The display may include a curved display portion. By a curved display portion the viewing angle may be increased as compared to a flat display which in turn promotes the ability of the digital assistant device of interacting with a plurality of users.

In an embodiment, the curved display portion may be cylindrical or conical. With both a cylindrical and a conical curved display portion, a high viewing angle may be achieved which in turn is advantageous in view of an interaction with a plurality of users. The viewing angle may range between 270° to 360°. Hence, a partial to full 360° interaction may be implemented in this way. By a conical curved display portion, the visual area may be expanded for multiple directions (horizontal and vertical) of viewing angles as compared to a cylindrical curved display portion.

In an embodiment, the display may be configured to display the output information uniquely assigned to a particular user in a portion of the display uniquely assigned to the particular user. In case of a display including a curved display portion the display may be configured to display output information uniquely assigned to a particular user on a portion of the curved display portion facing the particular user's position. In this way, users may fully focus on the information exclusively addressed to them. This might be of particular importance in the context of a digital assistant device configured as an in-car digital assistant device. In this case, a level of distraction of a driver may be reduced, if the driver as one of the plurality of users does not visually perceive information addressed to a co-driver as another one of the plurality of users. This in turn might contribute to increasing driving performance and, hence, driving safety.

In one or more exemplary embodiments, the digital assistant device may further comprise a housing defining a recess configured to house the display and a mechanism configured to retract the display into the recess such that the display is invisible from an outside of the digital assistant device and to move the display out of the recess to be visible from the outside. By this configuration, the user's needs may be better taken into consideration as compared to a display that is permanently visible. This might of particular importance in the context of an in-car digital assistant device where a driver's distraction level may be effectively reduced by retracting the display into the recess.

In case the display includes a touch-sensitive portion at an end portion of a curved display portion, the digital assistant device may be configured such that the touch-sensitive portion is still accessible from the outside of the housing even if the display is retracted into the recess. In this way, even though the display is not visible from the outside the touch-sensitive portion may still be used as an input component. The touch-sensitive portion may have a profile that matches the profile of the housing around the recess. In this way, an easy access to the touch-sensitive portion may be ensured.

In one or more embodiments, the output component may further comprise a lighting component separately formed from the display. The lighting component may function as an indicator of the touch-sensitive portion in case the display is retracted in the recess. The lighting component may be configured to provide user-characteristic light to clearly indicate a user interacting with the digital assistance device. The lighting component may include multiple colors which may be utilized to provide visual indications to the user as part multi-sensory inputs to the user. An example could be the color green indicating a 'yes' or 'clear' state by the assistant device or a color yellow indicating a need to pay attention. The lighting component may be configured to surround the recess.

The digital assistant device may be configured to visually indicate the particular user to which the output information is uniquely assigned by displaying a user-characteristic static or animated figure (avatar). In an embodiment, a user-characteristic avatar may be displayed when the digital assistant device switches between different users or when information is output to a particular user.

In one or more embodiments, the input component may include one or more digital cameras and/or one or more microphones, optionally one or more omni-directional microphones. By the input component configured in this way, the number of users and their relative positions with respect to the digital assistant device may be reliably determined, e.g. by comparing signals received from different digital cameras or microphones. By these sensors, monitoring an emotional state of a user is possible to promote a human-like interaction between the digital assistant device and a user. In addition, the input component may further include Radar, Lidar and infrared sensors for gesture and/or health sensing.

The digital assistant device may further include one or more loudspeakers as output component to enable a human-like interaction between the digital assistant device and a plurality of users. Further, a voice-only mode may be implemented by the output component configured in this way, to reduce the driver's distraction level and to allow for the different users preferred driving mode. A voice-only mode may be provided in case the display is retracted in the recess.

In one or more embodiments, the digital assistant device may be equipped with onboard or cloud-based artificial intelligence implemented by a neural network or simple object-oriented programming, with partial/limited or full vehicle head unit access, with a PC based or fully internally developed embedded solution and/or with a secured network.

By a digital assistant device configured as described above, visual interaction in a multi-user environment by addressing users individually may be implemented. In addition, capturing emotions and other sensing inputs is possible to provide necessary information visually and vocally or prompting to trigger associated functions, e.g. in a connected-car environment. Furthermore, it is possible to address Human-Machine-Interaction (HMI) needs of users in various scenarios by adapting to different situations which are either user initiated or sensed through the digital assistant device.

Examples for information and functions are: displaying a welcome screen incorporated with face detection, displaying a car condition overview and providing a service booking interface, traffic update and navigation, fatigue detection, automated driving takeover, and songs selection based on mood detection.

BRIEF DESCRIPTION OF THE DRAWINGS

The present disclosure will be described in more detail in the following with reference to the accompanying drawings that show.

DETAILED DESCRIPTION

Figure 1:
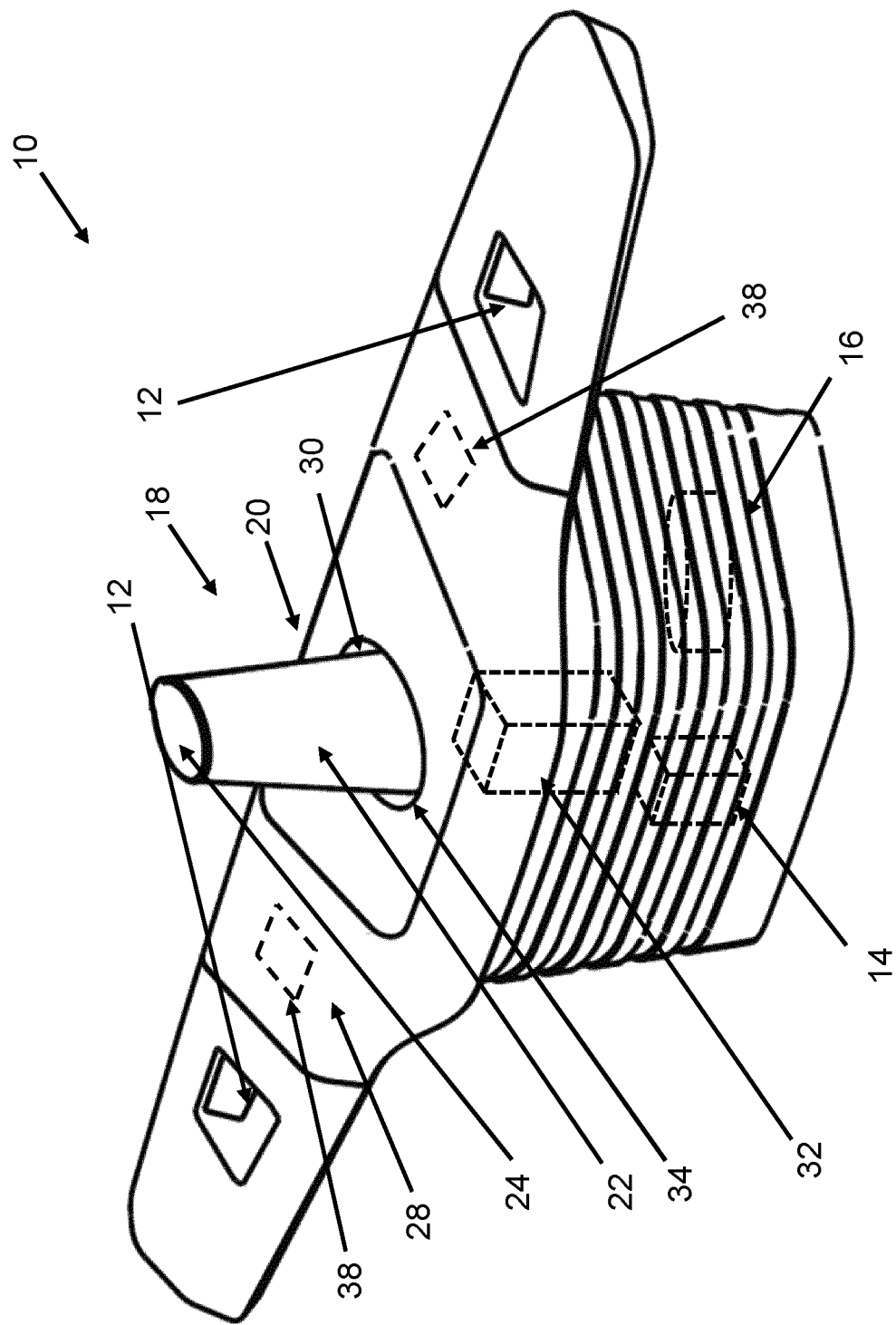
FIG. 1 a schematic representation of a digital assistant device.

FIG. 1 is a schematic representation of a digital assistant device 10. The digital assistant device 10 may include: input component such as one or more digital cameras (e.g. cameras of a driver monitoring system) 12 or one or more microphones (e.g. one or more omni-directional microphones) 14 configured to acquire information from a plurality of users in a predetermined area around the digital assistant device 10 and to output signals indicative of the acquired information, processing component 16 configured to receive the signals output by the input component 12, 14 and to generate individual user output information for several or each of the users, and output component 18 configured to output the generated output information uniquely assigned to a particular user or to particular users in a user-characteristic way or in user-characteristic ways. The digital assistant device 10 may be configured as an in-car digital assistant device which is optionally mounted in a dashboard of a car.

By the above configuration, the digital assistant device 10 may be configured to handle the inputs from a plurality of users individually, to process the information received from the plurality of users individually, and to output information in a user-characteristic way/in user characteristic ways. Consequently, the digital assistant device 10 may be configured for an individual interaction with a plurality of users in a multi-user environment such as in a car. In an in-car environment, the plurality of users may include or may consist of a driver and a co-driver. In such a case, the predetermined area around the digital assistant device 10 may correspond to the interior of the car.

The processing component 16 may be configured to determine the user's positions relative to the digital assistant device 10 from the signals output by the input component 12, 14. The relative user's positions may be used to optimize the output of the output component 18 with respect to the individual users and to thereby enhance the user experience.

The processing component 16 may include one or more processors operatively coupled to one or more memories such as a read-only memory (ROM) and/or a random-access memory (RAM).

The output component 18 may include a display 20. The display 20 may be configured as or may include an LCD, LED, μLED or OLED display and/or may be configured as a high-resolution display. The display 20 may include a curved display portion 22. By the curved display portion 22 the viewing angle may be increased as compared to a flat display which in turn promotes the ability of the digital assistant device 10 of individually interacting with a plurality of users.

Figure 2:
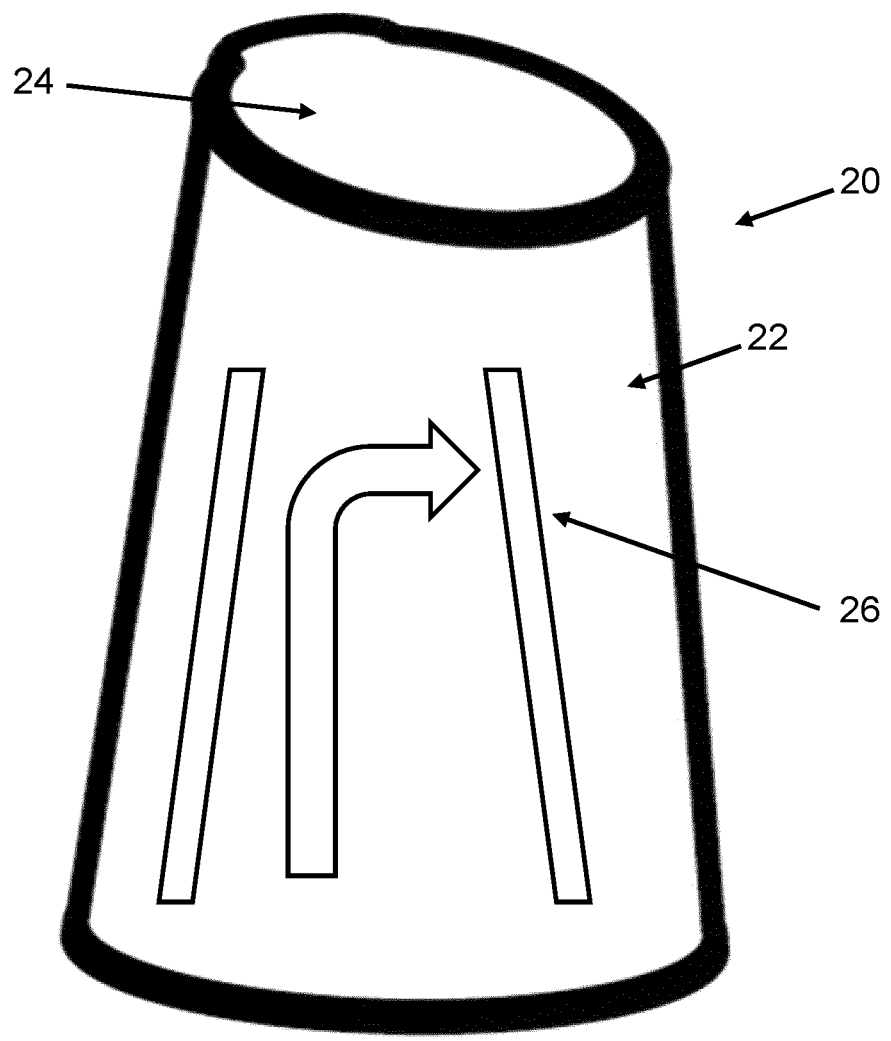
FIG. 2 a schematic representation of a display including a curved display portion implementing a navigation function.
Figure 3:
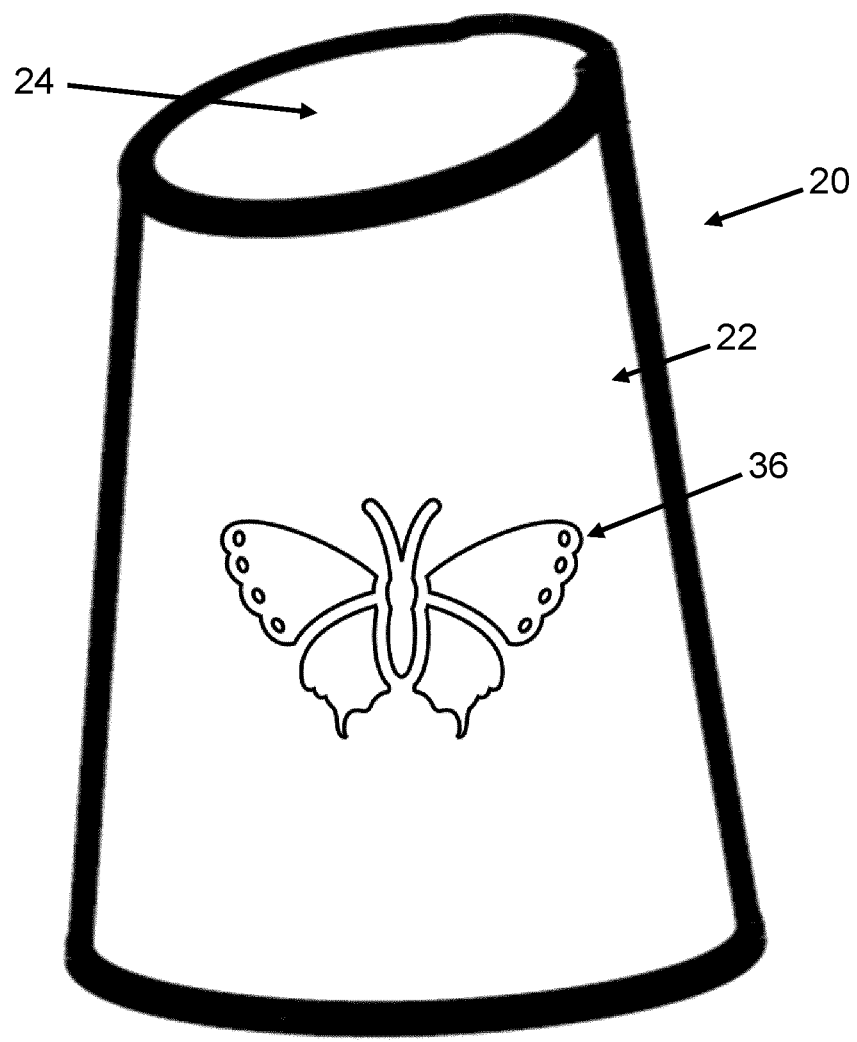
FIG. 3 a schematic representation of the curved display portion displaying a user-characteristic avatar.

In an embodiment, the curved display portion 22 may be cylindrical or, as shown in FIGS. 1-3, conical. With both a cylindrical and a conical curved display portion 22, a multi-directional (horizontal and/or vertical) high viewing angle may be achieved which in turn is advantageous in view of an interaction with a plurality of users. In addition, a partial to full 360° interaction may be implemented in this way. The viewing angle may range between 270° to 360°. By a conical curved display portion 22, the visual area may be expanded as compared to cylindrical curved display portion.

At least a part of the display 20 may be configured as a touch-sensitive display. In this way, the display 20 may act as an input component, i.e. input and output components are combined in a common component, thereby contributing to a compact overall setup. In an embodiment, the display 20 may include a touch-sensitive portion 24 which is separated from the curved display portion 22. The touch-sensitive portion 24 may be provided at an end portion (e.g. at an upper part in a gravitational direction) of the curved display portion 22 as shown in FIGS. 1-3. The touch-sensitive portion 24 may have an ergonomic shape to facilitate the input of a user. In the example shown in the figures, the touch-sensitive portion 24 is tilted forward. This shape might be advantageous in a car environment, since it is easily accessible by a driver and a co-driver, thereby facilitating an input by the driver or the co-driver via the touch-sensitive portion 24.

In an embodiment, the display 20 may be configured to display the output information uniquely assigned to a particular user in a portion of the display 20 uniquely assigned to the particular user. In case of a display 20 including a curved display portion 22, as shown in FIGS. 1-3, the display 20 may be configured to display output information uniquely assigned to a particular user on a portion of the curved display portion 22 facing the particular user's position. In this way, other users are not distracted by information which is not addressed to them.

This is exemplarily shown in FIG. 2 where navigation instructions 26 are displayed on a side of the curved display portion 22 such as not to be visible from the other side. This might be of particular importance to a digital assistant device 10 configured as an in-car digital assistant device where navigation instructions are only relevant for a driver but not for a co-driver. Conversely, information that is not relevant for a driver may be displayed on a side of the curved display portion 22 not visible by a driver. In this way, a level of distraction of the driver can be minimized. This in turn might contribute to increasing driving performance and, hence, driving safety.

As shown in FIG. 1, the digital assistant device 10 may further comprise a housing 28 defining a recess 30 configured to house the display 20 and a drive mechanism 32 configured to retract the display 20 into the recess 30 such that the curved display portion 22 is not visible from an outside of the digital assistant device 10 and to move the display 20 out of the recess 30 such that the curved display portion 22 is visible from the outside. By this configuration, the user's needs may be better taken into consideration as compared to a display 20 that is permanently visible from the outside of the digital assistant device 10. This might be of particular importance to an in-car digital assistant device where a driver's distraction level may be effectively reduced by retracting the display 20 into the recess 30.

In case the display 20 includes a touch-sensitive portion 24 at an end portion (upper portion) of the curved display portion 22, the digital assistant device 10 may be configured such that the touch-sensitive portion 24 is still accessible from the outside of the housing 28. In this way, even though the display 20 is not visible from the outside, the touch-sensitive portion 24 may still be used as an input component. The touch-sensitive portion 24 may have a profile that matches the profile of the housing 28 around the recess 30. In this way, the access to the touch-sensitive portion 24 can be facilitated.

As indicated in FIG. 1, the output component 18 may further include a lighting component 34 separately formed from the display 20. The lighting component 34 may function as an indicator of the touch-sensitive portion 24 in case the display 20 is retracted in the recess 30. The lighting component 34 may be configured to provide user-characteristic light to clearly indicate a user interacting with the digital assistance device 10. The lighting component 34 may include multiple colors which may be utilized to provide visual indications to the user as part multi-sensory inputs to the user. An example could be the color green indicating a 'yes' or 'clear' state by the assistant device or a color yellow indicating a need to pay attention. The lighting component 34 may be configured to surround the recess 30, as indicated in FIG. 1.

The digital assistant device 10 may be configured to visually indicate the particular user to which the output information is uniquely assigned by displaying a user-characteristic static or animated FIG. 3 (avatar). In an embodiment, a user-characteristic avatar 36 may be displayed when the digital assistant device 10 switches between different users or when information is output to a particular user.

As set forth above, the input component may include one or more digital cameras 12 and/or one or more microphones 14. By the input component configured in this way, the number of users and their relative positions with respect to the digital assistant device 10 may be reliably determined, e.g. by comparing signals received from different digital cameras 12 or microphones 14. By these input component, monitoring an emotional state of a user is possible to promote a human-like interaction between the digital assistant device 10 and a user. In addition, the input component may further include Radar, Lidar and infrared sensors for gesture and/or health sensing.

The digital assistant device 10 may further include one or more loudspeakers 38 as output component 18 to enable a human-like interaction between the digital assistant device 10 and a plurality of users. Further, a voice-only mode may be implemented by output means 18 configured in this way to reduce the driver's distraction level and to allow for the different users preferred driving mode.

In one or more embodiments, the digital assistant device 10 may be equipped with onboard or cloud-based artificial intelligence implemented by a neural network or simple object-oriented programming, with partial/limited or full vehicle head unit access, with a PC based or fully internally developed embedded solution and/or with a secured network.

By a digital assistant device 10 configured as described above, visual interaction in a multi-user environment by addressing users individually is possible. In addition, capturing emotions and other sensing inputs is possible to provide necessary information visually and vocally or prompting to trigger associated functions, e.g. in a connected-car environment. Furthermore, it is possible to address Human-Machine-Interaction (HMI) needs of users in various scenarios by adapting to different situations which are either user initiated or sensed through the digital assistant device 10.

Examples for information and functions of the digital assistant device are: displaying a welcome screen incorporated with face detection, displaying a car condition overview and providing a service booking interface, traffic update and navigation, fatigue detection, automated driving takeover, and songs selection based on mood detection.

The invention claimed is:

1. A digital assistant device, comprising:
an input component configured to acquire information from a plurality of users in a predetermined area around the digital assistant device and to output signals indicative of the acquired information,
a processing component configured to receive the signals output by the input component and to generate individual user output information for several or each of the users, and
output component configured to output the generated output information uniquely assigned to a particular user in a user-characteristic way,
wherein the output component includes a display, wherein the display includes a curved display portion, wherein the display includes a touch-sensitive portion at an end portion of the curved display portion, and wherein in a retracted state of the display, the touch-sensitive portion at the end portion of the curved display portion is accessible from the outside of the housing.

2. The digital assistant device of claim 1, wherein the processing component is configured to determine the position of a user or the positions of several users or the position of each user relative to the digital assistant device from the signals output by the input component.

3. The digital assistant device of claim 1, wherein the curved display portion has a cylindrical or conical shape.

4. The digital assistant device of claim 1, wherein the display is configured to display the output information uniquely assigned to a particular user in a portion of the display uniquely assigned to the particular user.

5. The digital assistant device of claim 1, wherein the display is configured to display output information uniquely assigned to a particular user on a portion of the curved display portion facing the particular user's position.

6. The digital assistant device of claim 1, further comprising a housing defining a recess configured to house the display and a drive mechanism configured to retract the display into the recess and to move the display out of the recess.

7. The digital assistant device of claim 1, wherein the output component further comprise a lighting component separately formed from the display.

8. The digital assistant device of claim 1, configured to visually indicate the particular user to which the output information is uniquely assigned by displaying a user-characteristic static or animated figure.

9. The digital assistant device of claim 1, wherein the input component comprises one or more digital cameras and/or one or more microphones, optionally one or more omni-directional microphones.

10. The digital assistant device of claim 1, wherein the output component further comprises one or more loudspeakers.

11. The digital assistant device of claim 1, wherein the digital device is configured as an in-car digital assistant device.

* * * * *